Patented Oct. 18, 1938

2,133,586

UNITED STATES PATENT OFFICE 2,133,586

FROZEN CONFECTION, COATING COMPOUND THEREFOR, AND PROCESS OF MAKING COATING COMPOUND

Otto C. Stanger and Alva Thompson, Chicago, Ill., assignors, by mesne assignments, to Corn Products Refining Company, New York, N. Y., a corporation of New Jersey No Drawing. Application January 16, 1936, Serial No. 59,407

14 Claims. (Cl. 99—136)

This invention relates to the production of frozen or low temperature confections, or food products such as ice cream bars which are covered with edible coatings; and the primary object of the invention is to provide an improved coating for confections or food products of this type, more especially for ice cream bars or other bodies or articles made of ice cream or like compounds requiring low temperature storage.

The coatings heretofore used for ice cream bars have been composed of a fat containing substance such as chocolate to which additional fat substance and sugar have sometimes been added; and the method is to melt the fat of the chocolate, chocolate consisting of about 50% fat, and to dip the bars into the thus liquefied coating substance, the fat of which congeals in contact with the cold ice cream so that coatings are formed on the bars that make the articles easier to handle.

A coating of this sort is subject to certain objections and limitations: the coating is hard and brittle at the temperature of the ice cream, giving an unpleasant sensation in the mouth and having a tendency to crack and break away in large pieces from the bar when the bar is bitten into or cut; the coating is practically limited to one which is chocolate flavored, chocolate apparently being the only fat containing substance that has been found useable for this purpose; it is necessary to use a chocolate high in fats, and this increases the cost of the article; any coating consisting primarily of chocolate is quite expensive; also the dipping temperature is undesirably high.

According to the present invention a coating is provided for low temperature or frozen confections—which term is intended to include ice cream bars and other frozen confections or articles of food—which is changed from the liquid to the solid state by the crystallization of a crystallizable sugar contained in the coating compound and forming its basic and principal ingredient, instead of by the solidification of a melted fat. The sugar used is dextrose in a dry or crystalline state and, in part at least, anhydrous dextrose; and the method of crystallization involves the hydration of the anhydrous dextrose, that is, the re-crystallization of the anhydrous dextrose as dextrose hydrate, which operation takes place, with the amount of water used, during the preparation of the coating compound due to the fact that at the concentration and temperature employed, the solution is unsaturated as to anhydrous dextrose and supersaturated as to dextrose hydrate, so that the anhydrous dextrose goes into solution and dextrose crystallizes out of solution as the hydrate. Among the advantages accruing from the use for ice cream bars and like articles of coating material compounded on this principle are the following: a coating is provided which is soft, firmly adherent to the ice cream and of much the same texture and consistency as the ice cream itself so that when the bar is eaten or cut with a knife, fork or spoon, the coating will not crack and break away from the bar to any extent; the coating is not limited to a chocolate flavor or to the color of chocolate, but can be flavored with any desired flavoring material and can be given any desired color; if a chocolate coating is desired, it is possible to use only so much chocolate as may be necessary to give the desired flavor, and it is possible to use cocoa, i. e. chocolate from which a large part of the fat has been removed, which reduces cost; and the dipping process when the coating is performed in this manner is facilitated because of the lower dipping temperature.

In exemplification of the invention two specific examples will be given, one for a chocolate flavored coating and the other for a coating having some other desired flavor. The formulas given are purely exemplary and illustrative and are not to be considered as limiting the invention to the preferred data given.

*Example 1—Formula for chocolate ice cream coating.*—The following ingredients are used in substantially the proportions as follows, these materials being divided into three groups to indicate the preferred method of compounding:

| | Parts |
|---|---|
| (a) Anhydrous dextrose | 300 |
| Corn syrup (43° Baumé glucose) | 50 |
| Powdered dextrose hydrate | 2 |
| Water | 105 |
| (b) Dextrose hydrate or anhydrous dextrose | 220 |
| Water | 130 |
| Cocoa | 100 |
| Salt | 1 |
| (c) Gelatin | 15 |
| Water | 100 |

A fondant is first prepared by combining the ingredients in the (a) group. The corn syrup is dissolved in the water, preferably at ordinary room temperature, or slightly above, the dextrose added, and the mixture beaten until palpable graininess disappears. The product is a fondant of very fine crystals.

The ingredients of the (b) group are placed in a double boiler and heated until the sugar is all in solution. The gelatin of group (c) is dispersed in the water by heating. While the (b) and (c) ingredients are still warm, they are beaten uniformly into the fondant formed from the (a) ingredients. If the resulting mixture is too viscous for dipping at the working temperature of about 86° Fahrenheit, it is warmed to 95°–104° Fahrenheit, and then cooled quickly to 86° Fahrenheit before using.

Ice cream which has been molded or formed into the desired shape and cooled to a temperature near that of dry ice is then coated with this mixture by dipping the bars or other forms into the mixture with the latter preferably at about 86° Fahrenheit. The coated pieces are then placed in a chamber and cooled at approximately the temperature of dry ice until hard enough to handle. After which, they may be held at the preferred storage temperature for the ice cream.

The first step of the process, that is the preparation of the coating, brings about the hydration of the anhydrous dextrose. At the concentration indicated and at ordinary room temperatures, in fact at any temperature below 122° Fahrenheit, the solution will be unsaturated in respect to anhydrous dextrose but saturated in respect to hydrate dextrose; so that in the making of the compound the anhydrous dextrose will go into solution and dextrose hydrate crystallize out of the solution, the crystallization of the hydrate continuing after the coating compound has been transferred to the ice cream bars because of the lower temperature to which the coating is exposed. The quantity of water used is such that the coating compound will be unsaturated as to the anhydrous form of dextrose but slightly supersaturated with respect to the hydrate form.

The small quantity of crystalline hydrate dextrose, preferably powdered, is used, as specified, in order to provide nuclei for initiating the desired hydrate crystallization. If, however, ordinary commercial anhydrous dextrose is used, particularly if the anhydrous dextrose be powdered, it may not be necessary to use the dextrose hydrate for nucleation, since commercial anhydrous dextrose is always to some slight extent, at least, hydrated.

It is preferable to use a certain amount of non-crystallizable sugar substance, such as the corn syrup, specified, and a certain amount of an edible colloidal substance, such as gelatin, in order to give the coating a close and smooth texture. The fat of the cocoa, of which the cocoa contains about 10 to 20 percent, is a desirable ingredient in order to give the coating the proper consistency and inhibit bubble formation. By using anhydrous dextrose as a primary ingredient and taking advantage of the fact that at room temperatures and at the proper concentration a dextrose solution will be unsaturated in respect to the anhydrous and saturated in respect to the hydrate, it is possible to bring the coating material to a state of supersaturation, for the type of crystallization desired without any evaporating operation. Also one obtains, through the hydration of the anhydrous dextrose, a very great reduction in the particle size of the solid phase dextrose without having to completely dissolve the dextrose and bring about supersaturation through evaporation. Even finely ground crystalline dextrose is coarse in respect to the crystals which can be produced through the hydration of the anhydrous dextrose.

*Example 2—Formula for non-chocolate coating.*—The following ingredients are used in the proportions as follows:

| | Parts |
|---|---|
| (a) Anhydrous dextrose | 300 |
| Corn syrup (43° Baumé glucose) | 50 |
| Powdered dextrose hydrate | 2 |
| Water | 105 |
| (b) 45% dextrose solution made by dissolving in water hydrate or anhydrous dextrose | 175 |
| (c) Gelatin | 7½ |
| Water | 50 |
| (d) Fat (melting point 92° F.) | 20 |
| (e) Flavoring substances such as vanilla, lemon, orange, almond, etc., and/or coloring matter. | |

The corn syrup is dissolved, preferably at or near room temperature, in the quantity of water specified under (a), the solid dextrose added and the mixture beaten until palpable graininess has disappeared.

The gelatin is dispersed in the water specified under (c) by heating in a double boiler, preferably below boiling temperature. The materials specified under (b), (c), (d) and (e) are mixed uniformly in the fondant formed by the (a) ingredients, and the mixture applied to the ice cream bars as in Example 1.

The fat specified under (d) corresponds to the fat element in the cocoa of Example 1.

In each example the coating mixture at the dipping temperature, so far as the dextrose and water system is concerned, consists of a suspension of finely divided hydrate crystals in a slightly supersaturated solution of dextrose. With the quantities of sugar and water specified the supersaturation will necessarily be slight; and this is important since material increase in the degree of supersaturation will result in coatings too viscous for convenience in dipping. Such coatings do not adhere well to the ice cream and may require a long time for ageing to the point where the necessary amount of crystallization has taken place. The solid dextrose hydrate in suspension was brought to its finely divided condition by means of recrystallization through the agency of the hydration reaction of anhydrous dextrose, the principle of which, broadly considered, is covered in co-pending application of Carl S. Miner, filed January 16, 1936, Serial No. 59,409, and is not claimed herein except as applied to the coating of low temperature confections. This finely divided condition of the suspended dextrose in a saturated dextrose solution could be obtained by boiling dextrose, either anhydrous or hydrate, with water, to a concentration which would give a solution supersaturated with respect to dextrose hydrate. The more convenient and economical method, however, is that described in connection with the Examples 1 and 2 above.

It is understood that all modifications of process and product within the scope of the appended claims are intended to be covered herein.

We claim:

1. Process of making a coating for frozen confections which comprises mixing with crystalline anhydrous dextrose water in such quantity that a dextrose solution exists unsaturated with respect to anhydrous dextrose but slightly supersaturated with respect to dextrose hydrate.

2. Process of making a coating for frozen confections which comprises mixing with crystalline anhydrous dextrose, and a small quantity of dextrose hydrate to initiate hydrate crystallization, water in such quantity that a dextrose solution exists unsaturated with respect to anhydrous dextrose but supersaturated with respect to dextrose hydrate.

3. Process of making a coating for frozen confections which comprises mixing with crystalline anhydrous dextrose dextrose in solution together with enough water so that a dextrose solution exists which is unsaturated with respect to anhydrous dextrose but supersaturated with respect to dextrose hydrate.

4. Process of making a coating for frozen confections which comprises mixing with crystalline anhydrous dextrose, and a small quantity of dextrose hydrate to initiate hydrate crystallization, dissolved dextrose together with enough water so that a dextrose solution exists unsaturated with respect to anhydrous dextrose but supersaturated with respect to dextrose hydrate.

5. Process of making a coating for frozen confections which consists in forming a suspension of dextrose hydrate crystals in dextrose solution supersaturated in respect to dextrose hydrate and containing also corn syrup, a fat and gelatin.

6. Process of making a coating for frozen confections which comprises mixing together anhydrous dextrose and water and beating the same to form a fine grained fondant; adding dextrose dissolved in water; dispersing gelatin in water and adding the same to the mixture; the water being used in such quantity that a solution is formed unsaturated with respect to anhydrous dextrose but supersaturated with respect to dextrose hydrate.

7. Process of making a coating for frozen confections which comprises mixing together anhydrous dextrose and water with a small quantity of powdered hydrate dextrose and beating the same to form a fine grained fondant; adding dextrose dissolved in water; dispersing gelatin in water and adding the same to the mixture; the water being used in such quantity that a solution is formed unsaturated with respect to anhydrous dextrose but supersaturated with respect to dextrose hydrate.

8. A product consisting of a frozen confection and an edible coherent coating which is solid at the temperature of the frozen confection and contains corn syrup and, as its solidifying ingredient, hydrate dextrose.

9. A product consisting of a frozen confection and an edible coherent coating which is solid at the temperature of the frozen confection and contains gelatin and, as its solidifying ingredient, hydrate dextrose.

10. A product consisting of a frozen confection and an edible coherent coating which is solid at the temperature of the frozen confection and contains corn syrup, gelatin and, as its solidifying ingredient, hydrate dextrose.

11. A product consisting of a frozen confection and an edible coherent coating which is solid at the temperature of the frozen confection and contains gelatin, corn syrup, a fat and hydrate dextrose.

12. An edible coating compound adapted to solidify in contact with a frozen confection which compound contains corn sugar, gelatin, a fat, dextrose hydrate crystals and dissolved dextrose with the liquid phase in supersaturated condition during the coating operation.

13. Process of making a coating for frozen confections which comprises mixing together approximately 300 parts of anhydrous dextrose, 50 parts of corn syrup, 2 parts of dextrose hydrate and 105 parts of water and beating the same to form a fine grained fondant; and mixing into this fondant 220 parts of dextrose and 100 parts of cocoa dissolved and dispersed in 130 parts of water, and also 15 parts of gelatin dispersed in 100 parts of water.

14. Process of making a coating for frozen confections which comprises mixing together approximately 300 parts of anhydrous dextrose, 50 parts of corn syrup, 2 parts of dextrose hydrate and beating the same to form a fine grained fondant; and adding to said fondant 175 parts of 45% dextrose solution, 7½ parts of gelatin dispersed in 50 parts of water, and 20 parts of fat.

OTTO C. STANGER.
ALVA THOMPSON.